US009589188B2

(12) United States Patent
Holt

(10) Patent No.: US 9,589,188 B2
(45) Date of Patent: Mar. 7, 2017

(54) METHOD AND APPARATUS PERTAINING TO IDENTIFYING OBJECTS OF INTEREST IN A HIGH-ENERGY IMAGE

(71) Applicant: Varian Medical Systems, Inc., Palo Alto, CA (US)

(72) Inventor: Kevin M. Holt, Chicago, IL (US)

(73) Assignee: Varian Medical Systems, Inc., Palo Alto, CA (US)

( * ) Notice: Subject to any disclaimer, the term of this patent is extended or adjusted under 35 U.S.C. 154(b) by 0 days.

(21) Appl. No.: 13/676,534

(22) Filed: Nov. 14, 2012

(65) Prior Publication Data

US 2014/0133718 A1 May 15, 2014

(51) Int. Cl.
- G06K 9/00 (2006.01)
- G06T 7/00 (2006.01)
- G06K 9/32 (2006.01)
- G01V 5/00 (2006.01)

(52) U.S. Cl.
CPC ....... G06K 9/00624 (2013.01); G01V 5/0016 (2013.01); G06K 9/3241 (2013.01); G06T 7/0004 (2013.01); G06K 2209/09 (2013.01); G06T 2207/30112 (2013.01)

(58) Field of Classification Search
CPC ................................................. G06K 2209/09
See application file for complete search history.

(56) References Cited

U.S. PATENT DOCUMENTS

| | | |
|---|---|---|
| 5,838,758 A | 11/1998 | Krug et al. |
| 8,116,551 B2 | 2/2012 | Gallagher et al. |
| 2008/0125648 A1 | 5/2008 | Bi et al. |
| 2008/0152082 A1 * | 6/2008 | Bouchard et al. ............... 378/57 |
| 2009/0003699 A1 * | 1/2009 | Dugan et al. ................. 382/173 |
| 2009/0052732 A1 * | 2/2009 | Dugan et al. ................. 382/100 |
| 2009/0252295 A1 * | 10/2009 | Foland ....................... 378/98.12 |
| 2009/0290773 A1 * | 11/2009 | Holt et al. ..................... 382/131 |
| 2009/0297039 A1 | 12/2009 | Reinpoldt, III et al. |

(Continued)

OTHER PUBLICATIONS

Boykov, Yuri Y., and M-P. Jolly. "Interactive graph cuts for optimal boundary & region segmentation of objects in ND images." Computer Vision, 2001. ICCV 2001. Proceedings. Eighth IEEE International Conference on. vol. 1. IEEE, 2001.*

(Continued)

*Primary Examiner* — Chan Park
*Assistant Examiner* — Geoffrey E Summers
(74) *Attorney, Agent, or Firm* — Fitch, Even, Tabin & Flannery LLP

(57) ABSTRACT

A control circuit having access to at least one high-energy image of a scene assesses that image to identify candidate obfuscaters as well as candidate obfuscated objects. This control circuit then processes information regarding the candidate objects to identify objects of interest. By one approach these objects of interest are deemed "of interest" as a function of their being obfuscated in a particular context. By one approach these teachings will accommodate identifying objects as being of interest as a function, at least in part, of the material composition of both the object as well as the visual obfuscater. These teachings also will accommodate peeling away background content/attenuation information in order to separate (and facilitate displaying) a given object in relative isolation from that background content.

21 Claims, 4 Drawing Sheets

(56) References Cited

U.S. PATENT DOCUMENTS

| | | | |
|---|---|---|---|
| 2010/0092057 A1* | 4/2010 | Garms | 382/131 |
| 2010/0104072 A1* | 4/2010 | Gordon et al. | 378/98.9 |
| 2010/0310175 A1* | 12/2010 | Holt | 382/195 |
| 2011/0206240 A1* | 8/2011 | Hong et al. | 382/103 |

OTHER PUBLICATIONS

Mendonça, Paulo RS, et al. "Multi-material decomposition of spectral CT images." SPIE Medical Imaging. International Society for Optics and Photonics, 2010.*

"Obfuscator, n." OED Online. Oxford University Press, Mar. 2014. Web. Jun. 5, 2014.*

"About High-resolution X-ray CT." High Resolution X-ray CT Facility. The University of Texas at Austin, Department of Geological Sciences, Apr. 19, 2008. Web. Dec. 1, 2014.*

"How Computed Tomography Works." Industrial CT 3D X-ray Systems. North Star Imaging, Inc., Apr. 21, 2009. Web. Dec. 1, 2014.*

Lu, Qiang. "The utility of X-ray dual-energy transmission and scatter technologies for illicit material detection." (1999).*

Lu, Qiang, and Richard W. Conners. "Using image processing methods to improve the explosive detection accuracy." Systems, Man, and Cybernetics, Part C: Applications and Reviews, IEEE Transactions on 36.6 (2006): 750-760.*

Hwang, Yun Koo; Authorized Officer; PCT Search Report and Written Opinion from related application No. PCT/US2013/070118 dated Feb. 28, 2014; 13 pages.

* cited by examiner

METHOD AND APPARATUS PERTAINING TO IDENTIFYING OBJECTS OF INTEREST IN A HIGH-ENERGY IMAGE

TECHNICAL FIELD

This disclosure relates generally to the use of high-energy images to identify objects of interest.

BACKGROUND

The capture of high-energy images of a given object using penetrating energy (such as X-rays or the like) is well known in the art. Such high-energy images often comprise images having areas that are relatively darker or lighter (or which otherwise contrast with respect to one another) as a function of the density, path length, and/or composition of the constituent materials that comprise the scene being imaged. This, in turn, can serve to provide views of objects that are otherwise obfuscated from visual inspection.

The use of high-energy images finds myriad applications. For example, in a security application setting such images can help to provide views of objects that are illegal and/or that pose a potential threat. Prior art approaches also disclose ways to leverage high-energy images in order to determine the material composition of such objects.

Unfortunately, however, corresponding needs in these regards are logistically daunting. While the need to examine untold numbers of shipping containers at ports of entry is very real, for example, the sheer volume of content to be examined renders essentially all prior art approaches outmatched. This includes prior art approaches that automate to some significant degree the image-capture and/or image-analysis process.

Additionally, since X-ray imaging tends to superimpose objects in a radiographic image, existing methods to determine material composition of superimposed objects in general can typically only determine the composition of the superimposed combination. Often, however, to make an accurate risk assessment, it is preferable to determine a separate material composition for each superimposed object. While superposition is generally not a problem in three-dimensional imaging methods such as computerized tomography (CT), the ability to separately identify the composition of superimposed materials has been lacking in existing two-dimensional imaging approaches.

BRIEF DESCRIPTION OF THE DRAWINGS

The above needs are at least partially met through provision of the method and apparatus pertaining to identifying objects of interest in a high-energy image described in the following detailed description, particularly when studied in conjunction with the drawings, wherein.

Figure 1:
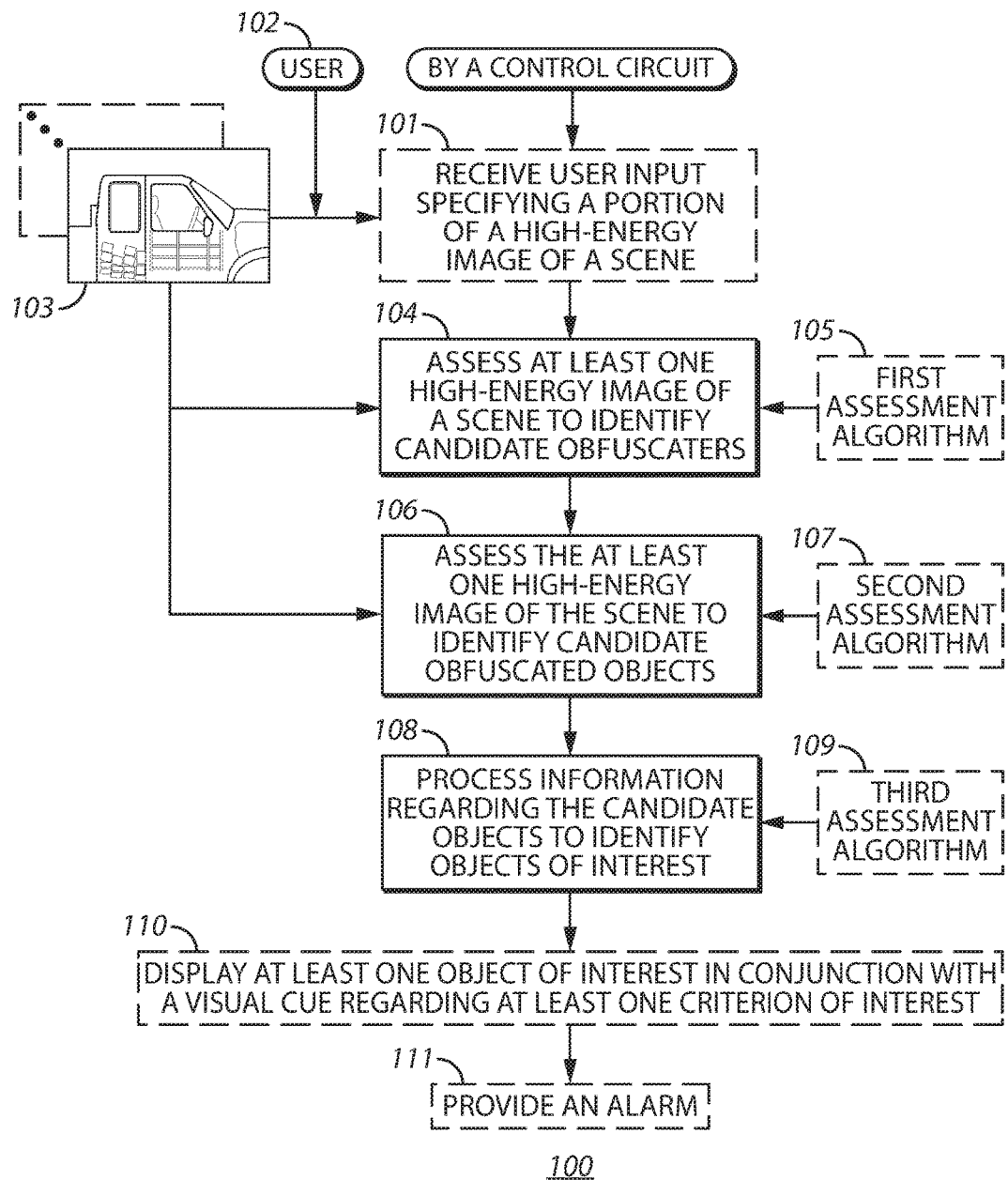
FIG. 1 comprises a flow diagram as configured in accordance with various embodiments of the invention.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

By one approach the present teachings serve to automatically find objects of interest within a cluttered scene. By another approach, in combination with the foregoing or in lieu thereof, the present teachings serve to estimate the material composition of a specific obfuscated object (regardless of whether that obfuscated object has been spotted automatically or manually).

Generally speaking, pursuant to these various illustrative embodiments, a control circuit having access to at least one high-energy image of a scene assesses that image to identify candidate visual obfuscaters as well as candidate obfuscated objects. This control circuit then processes information regarding the candidate obfuscaters and obfuscated objects to identify objects of interest.

By one approach, identifying an object (a candidate obfuscater, a candidate obfuscated object, or an object of interest) comprises estimating the material composition of such an object. By this approach, the foregoing assessments and processing comprise a material composition estimation step, which operates on regions that are either manually selected or automatically detected (or some combination thereof).

By another approach, identifying an object (a candidate obfuscater, a candidate obfuscated object, or an object of interest) comprises detecting the presence of such an object. For example, a large patch of material may be considered an obfuscater, and an object lying within such a patch may be considered a candidate obfuscated object. By one approach, objects of interest are deemed "of interest" as a function of their being obfuscated in a particular context. One ball bearing visually obfuscated from ordinary view by virtue of being located within a group of identical ball bearings would ordinarily not likely be "of interest" merely by the fact of its being obfuscated. By one approach these teachings will accommodate identifying objects as being of interest as a function, at least in part, of the material composition of both the object as well as the visual obfuscater. For example, a "ball bearing" comprised of plutonium that is visually obfuscated from ordinary view by virtue of being located within a group of identically-sized ball bearings that are comprised of steel might very well be considered to be "of interest." By this approach, the foregoing assessments and processing comprise a region-detecting step that produces one or more detected region(s) within the high energy image(s). The present teachings will also accommodate combining these two approaches. For example, the foregoing assessments can detect candidate obfuscaters, estimate their material composition, detect candidate obfuscated objects, estimate their material composition, effectively peel away the obfuscaters from the obfuscated objects, and from the results find a set of objects of interest and the material composition of each.

The foregoing assessments can be carried out, by one approach, using one or more corresponding assessment algorithms. If desired, these assessment algorithms can themselves depend upon corresponding assessment parameters. The assessment parameters can vary depending upon the algorithm and/or the particular assessment being conducted. For example, when a given assessment algorithm serves to identify candidate visual obfuscaters, the corresponding assessment parameter(s) might regard at least one of a particular attenuation constraint, a particular size constraint, a particular shape constraint, a particular edge constraint, a particular location constraint, a particular hole constraint, a particular blip constraint, and/or a particular material constraint.

By one approach, identifying objects of interest can be displayed in conjunction with a visual cue. That visual cue can reflect, for example, a particular corresponding criterion of interest. So configured, for example, an obfuscated weapon might be visually highlighted differently than obfuscated organic material.

These teachings are highly flexible in practice and will accommodate a wide variety of both variations as well as further elaborations. These teachings are also readily applied in conjunction with a variety of imaging methodologies, alone or in conjunction with one another, and hence can serve to greatly leverage the availability of such approaches in favor of extending the useful operational lifetimes of existing and/or deployed designs and platforms. Those skilled in the art will also appreciate that these teachings are highly scalable and will readily accommodate, for example, a wide variety of differently-sized scenes and/or numbers of high-energy images, assessment algorithms, and so forth.

Figure 2:
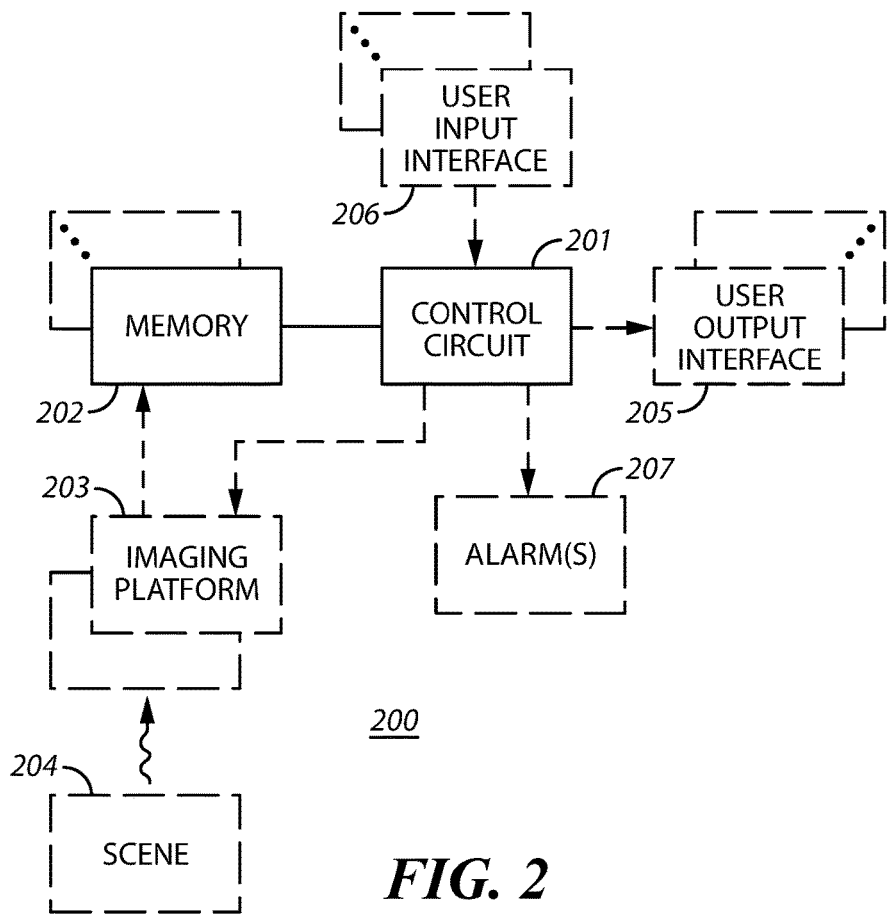
FIG. 2 comprises a block diagram as configured in accordance with various embodiments of the invention.

These and other benefits may become clearer upon making a thorough review and study of the following detailed description. Referring now to the drawings, and in particular to FIG. 1, an illustrative process 100 that is compatible with many of these teachings will now be presented. For the sake of an illustrative example it will be presumed here that a control circuit of choice carries out this process 100. FIG. 2 presents an example of an apparatus 200 having such a control circuit 201.

Such a control circuit 201 can comprise a fixed-purpose hard-wired platform or can comprise a partially or wholly programmable platform. These architectural options are well known and understood in the art and require no further description here. This control circuit 201 is configured (for example, by using corresponding programming as will be well understood by those skilled in the art) to carry out one or more of the steps, actions, and/or functions described herein.

This control circuit 201 operably couples to one or more memories 202. The memory 202 may be integral to the control circuit 201 or can be physically discrete (in whole or in part) from the control circuit 201 as desired. This memory 202 can also be local with respect to the control circuit 201 (where, for example, both share a common circuit board, chassis, power supply, and/or housing) or can be partially or wholly remote with respect to the control circuit 201 (where, for example, the memory 202 is physically located in another facility, metropolitan area, or even country as compared to the control circuit 201).

This memory 202 can serve, for example, to non-transitorily store the computer instructions that, when executed by the control circuit 201, cause the control circuit 201 to behave as described herein (for example, as described below in conjunction with FIG. 1). (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

This memory 202 can also serve, if desired, to store high-energy images as provided by, for example, one or more imaging platforms 203 of choice (such as, but not limited to, x-ray machines). These high-energy images can comprise, for example, x-ray images of a given scene 204 such as a scene that includes a mobile shipping container. (As used herein, the expression "mobile shipping container" will be understood to include a container that can be configured to contain items during transport of those items from one place to another (regardless of whether, at any given moment, the container actually has any items contained therein). Such containers can either include their own motive capabilities (such as a truck (including tractor trailers, tankers, flatbeds, or delivery trucks), automobile, motorcycle, boat, airplane, or other powered land/sea/air vehicle) or can comprise passive structures (such as intermodal containers (including the ubiquitous ISO container), suitcases, crates, railroad cars, trailers, and so forth).

A variety of imaging platforms are known in the art and their method of use well understood. As the present teachings are not overly sensitive to any particular choices in these regards, further details will not be provided here for the sake of brevity except where specifically provided below.

If desired, this apparatus 200 can also include one or more user output interfaces 205 and one or more user input interfaces 206 that also operably couple to the control circuit 201. Examples of user output interfaces 205 include, but are not limited to, any of a variety of displays and printers or the like that serve to convey visual content to a user. The user input interface 206 can comprise any of a variety of user-input mechanisms (such as, but not limited to, keyboards and keypads, cursor-control devices, touch-sensitive displays, joysticks, speech-recognition interfaces, gesture-recognition interfaces, and so forth) to facilitate receiving information (including operating instructions) from a user.

The present teachings are flexible in practice and such an apparatus 200 can certainly include other components as desired. By one approach, for example, the apparatus 200 can include one or more alarms 207 that operably couple to the control circuit. These alarms may comprise any of a variety of audible, visual, and/or haptic systems that are configured to notify a user of a given state or circumstance. Specific examples in these regards are provided below.

Referring again to FIG. 1, at 101 this process 100 will accommodate optionally having such a control circuit 201 receive user input 102 (as entered, for example, via the aforementioned user input interface 206) that specifies, in this example, a particular portion of a high-energy image 103 of a scene. (For the sake of having an illustrative example it will be presumed here that the scene includes a mobile shipping container and in particular, a truck. It will be understood that no particular limitations are intended in these regards and that the scene can include any of a variety of items.) For example, the user may be provided an opportunity to view the high-energy image (via, for example, the aforementioned user-output interface 207) on a display and to draw a circle (or other shape) around a particular area of interest to the user using a corresponding input mechanism. In some embodiments, this is the preferred approach, while in other embodiments it may be useful to skip step 101 and simply process the entire image. While this process 100 is not dependent upon such a step 101, in some cases such an accommodation can better suit the needs and/or requirements of a given application setting as described below in more detail.

At 104 the control circuit 201 assesses the aforementioned one or more high-energy images 103 of the scene to identify candidate visual obfuscaters. By one approach this assessment can comprise using at least a first assessment algorithm 105. If desired, this first assessment algorithm 105 is used in conjunction with a first set of assessment parameters such that the assessment algorithm 105 can essentially comprise processing and/or testing the high-energy image 103, directly or indirectly, with respect to at least some of the assessment parameters.

Accordingly, the assessment parameters can and will vary with respect to the needs of the application setting and/or the particular opportunities afforded thereby. Illustrative examples in these regards include, but are not limited to, particular attenuation constraints (such as requirements that image pixels be within a certain range, or that the relative difference between some image pixels and other image pixels be within a certain range), particular size constraints (such as a requirement that the size of the candidate obfuscater not be larger than and/or smaller than a particular dimension), particular shape constraints (such as a requirement that the shape of the candidate obfuscater have, or not have, a specific shape such as a narrow longitudinal member), particular edge constraints, particular location constraints (such as ignoring candidate obfuscaters in certain areas of a truck cabin while considering or even weighting favorably candidate obfuscaters that appear in other specified areas of the truck's cargo container), particular hole constraints (such as ignoring small holes in an object when considering an object's size), blip constraints (such as ignoring small spurious inclusions in an object), and/or particular material constraints (where, for example, multiple high-energy images of the same scene using differing energy values are available and permit a useful materials discrimination analysis as known in the art; in such a case, for example, it would be possible to, say, limit candidate obfuscaters to only obfuscaters that are comprised of metal, or a particular metal).

Accordingly, when detecting obfuscaters this assessment can provide for a fairly specific search for one or more obfuscaters of interest. This can include, for example, limiting the search to only possible obfuscaters in a specific area of a mobile shipping container having at least a particular size and that are comprised of a particular material. Accordingly, such an assessment algorithm can comprise, if desired, a particular string (or web) of one or more parameter-defined tests that collectively serve to parse the high-energy image with respect to visual obfuscaters. In the alternative, when estimating the composition of obfuscaters, this assessment can provide for tailored processing, accounting for factors such as the size of the obfuscater, the size of potential candidate obfuscated objects, allowable holes or blips in each, and adjusting such factors based on location or context.

To ensure clarity, it should be noted that as used herein, the expression "obfuscator" refers generally to any object that obfuscates the view of another object in an X-ray image. The decision of whether a particular object is indeed an obfuscator depends on the particular imaging task. For example, consider the effect of a truck wall on imaging the contents of the truck. Generally, a truck wall does not prevent a trained X-ray image inspector from identifying any shapes behind the truck wall. However, a truck wall might affect the material composition estimate of an object inside the truck; in typical cases, this effect is near negligible for thick objects, but significant for very thin objects. Thus one might say that a truck wall is not generally an obfuscator for finding objects inside the truck nor for estimating the material composition of thick objects, but is an obfuscator for estimating the material composition of very thin objects.

As another example, consider a pallet of uniform items, such as water bottles. If one were to remove one of the water bottles and replace it with a smuggled good, the rest of the water bottles would obfuscate the view of that smuggled good. Similarly, another item (not necessarily contraband) that is simply sitting next to the water bottles in the truck (positioned so they are superimposed in the X-ray image) would also be obfuscated by the water bottles. The obfuscators may be normal cargo items (typically shipped items, unaltered or minimally altered), normal parts of the mobile shipping container (such as wheel wells, refrigeration units, or an engine block), and may either intentionally or accidentally serve as an obfuscator. An obfuscator may also be items intentionally introduced specifically to confound cargo inspection systems (like lead boxes or steel boxes). Accordingly, exactly what constitutes an obfuscator in a given application setting can and will vary and can be, in practice, effectively defined by the selection of the aforementioned assessment parameters.

At 106 the control circuit 201 assesses the one or more high-energy images 103 to also identify candidate obfuscated objects—these are objects that may be obfuscated by the candidate visual obfuscaters identified above. Again, by one approach, this assessment can be undertaken using at least a second assessment algorithm 107 (which may, or may not, be different than the first assessment algorithm 105) in conjunction with a second set of assessment parameters. By one approach, this second assessment algorithm can find candidate obfuscated objects, limiting the search for candidate obfuscated objects to only things that occur "behind" a previously-identified candidate visual obfuscator (where "behind" simply means that the obfuscator and candidate obfuscated object are superimposed). Using this approach, while a given object might have a very provocative shape, the present process 100 could effectively ignore that object for the very simple fact that the object does not appear to actually be obfuscated. (This is not to say, of course, that the overall inspection process might not alert attending inspectors to the presence of this object; the point being made here by this example is that this object may not be a candidate "obfuscated" object per the interests of a given observer.) By another approach, the second assessment algorithm can estimate a material composition of a candidate obfuscated object by calculating the material composition of the region corresponding to that object.

These assessment parameters can be categorically similar (in whole or in part) to the assessment parameters noted above (and therefore represent, for example, size, shape, edge, location, and/or material constraints) though potentially different in terms of specific details and/or values. These teachings will accommodate categorically different assessment parameters as well, however, if desired. For example, one or more of this second set of assessment parameters could comprise constraints defined relative to an obfuscator, such as a minimum amount of additional attenuation, a minimum amount of missing attenuation, a minimum difference in attenuation (additional or subtractive), or a maximum fraction of the size of the obfuscater, or other similar variations, such as maximum missing attenuation.

Accordingly, this process 100 identifies objects that are potentially obfuscating other objects and then develops further information about those possibly-obfuscated objects. At 108 the control circuit 201 processes such information regarding the candidate objects to identify objects of interest. And again, by one approach, this processing can be undertaken using a third (or more) assessment algorithm 109 (that may be similar or identical to one or both of the first and second assessment algorithms 105 and 107 or not as desired) in conjunction with a corresponding third set of assessment parameters.

This third set of assessment parameters can use constraints similar to those noted above if desired. For example, these assessment parameters can comprise parameters regarding a particular size constraint on a size of a candidate object, a particular size constraint on a size of a visual obfuscator, a particular constraint on a relative size of a candidate object versus a visual obfuscator, a particular shape constraint, a particular edge constraint (such as the fraction of the border of the object that significantly coincides with a sufficiently strong edge in the image), a particular location constraint, a particular material constraint, and/or a particular constraint regarding a comparison of a boundary of a candidate object to a boundary of a corresponding candidate visual obfuscator (such as, for example, a constraint specifying that a given percentage of the periphery of the obfuscated object must have at least a minimum amount of the obfuscator surrounding the object).

These teachings will also accommodate relationship parameters (and/or the application of the assessment parameters in relation to one another). For example, an obfuscated object having a particular shape may be designated as being of interest only if the obfuscater is comprised of a particular material. Or, as another example, an obfuscated object comprised of organic material might only be of interest if obfuscated by something that is comprised of a different material. Or, and as yet another example, an obfuscated object having a particular shape and size may not be of interest if obfuscated by one or more other objects having the identical shape and size.

Generally speaking, this process 100 can work to help identify objects that appear to be actively obfuscated (as versus merely stored or contained in an ordinary way) as such effort may be suspicious in and of itself and an actively-obfuscated object may be worth visually scrutinizing. Accordingly, it can be insufficient to merely locate and note objects that are not readily visually discernible as most objects in a mobile shipping container are likely visually obfuscated at least to some extent. And it can also be insufficient to merely locate and note objects that match an objective categorical interest (such as an object shaped like a weapon or an object comprised of fissionable material) as not all objects of interest are so easily categorized or noted.

Still speaking generally, by one approach this process 100 works to estimate attenuation and material composition of a background layer, estimate attenuation and material composition of a background+target region, then peel the background layer away to estimate the attenuation and material composition of a target object.

Again speaking generally, by another approach this process 100 works to estimate shielding in the image and to then estimate hidden objects within the ambit of the foregoing shielding. The process 100 then estimates shielded objects using the previously estimated hidden objects.

By one approach the aforementioned first algorithm, via a series of corresponding steps and determinations, identifies regions in the high-energy image having attenuation beyond some threshold, diameters above some threshold, and areas (i.e., overall size) above some threshold. In addition, prior to making such determinations, if desired, the algorithm's steps can further identify holes in objects, which holes are smaller than some minimum size, and cause those holes to be ignored (or temporarily filled in) prior to making the aforementioned determinations. Similarly, in lieu of the foregoing or in combination therewith, the algorithm's steps can further include identifying so-called blips (in effect, the opposite of holes) that are also smaller than some minimum size and cause those blips to be removed from consideration prior to making the aforementioned determinations.

By this approach, the estimated hidden objects step, accomplished via the aforementioned second algorithm, works, pursuant to one approach, by configuring the second algorithm to look for regions within the estimated shielding regions where, roughly, the diameter of the hidden object is below some maximum diameter, the hidden attenuation (that is, the attenuation beyond the filtered shielding attenuation) is at least mostly above some desired threshold, and where most of the object's boundary contains a sufficiently strong edge.

By this approach, the second algorithm can calculate the aforesaid hidden attenuation by, for example, smoothing the pixel values for shielding pixels such that the values for objects smaller than a maximum hidden diameter are filtered out and then subtracting this smoothed shielding from the original data to yield a raw hidden attenuation estimate. (Those skilled in the art will recognize "smoothing" as referring to the statistics/image processing-based processing of a given data set to create an approximating function that works to capture significant patterns within the data while not necessarily capturing noise or fine-scale structures and rapid phenomena. Generally speaking, smoothing aims to offer a general idea of relatively slow changes of value with little attention being paid to closely matching the data values per se. Smoothing methodologies typically have one or more associated tuning parameters that serve to control the extent of the smoothing.) In particular, outlier-resilient smoothing techniques can be quite effective here.

By this approach, the aforementioned third algorithm, in turn, effects the estimate shielded step by, for example, finding hidden regions where, roughly, the diameter of the hidden object is between some minimum and some maximum, the area of the hidden object is between some minimum and some maximum, and the skeleton length of the hidden object (comprising, for examples, a line drawn through the length of the object) is greater than some minimum value, and where at least X % (where X equals, for example, 50) of the border of the object is surrounded by at least some minimum radius of shielding material. The estimate shielded step can also take into account the estimated material of the hidden object with the shielding peeled away. This can be accomplished by incorporating the previous approach, where the "shielding" regions here describe the "background layer" of the previous approach, a "hidden object" region here describes a "background+target region" in the previous approach, and the material composition of the target object produced by the previous approach is used as an input to the third algorithm here.

Those skilled in the art will recognize and understand that the foregoing examples for the first, second, and third algorithms do not exhaust all possibilities in these regards. Instead, it will be understood that these examples for these algorithms are offered for the sake of providing illustrative examples and without any intent to suggest any limitations in these regards.

Upon identifying such objects of interest in the scene being examined, by one optional approach and at 110 the control circuit 201 displays such objects in conjunction with a visual cue to thereby highlight the object as being, in fact, of interest. This displaying can involve, if desired, using a rendering algorithm (that relies, in turn, upon one or more rendering-algorithm parameters) to effect the desired highlighting. In such a case, and if desired, this rendering algorithm may be selected (for example, by the user using dynamically-entered user selections) from amongst a plurality of candidate rendering algorithms. These teachings will accommodate a wide variety of highlighting approaches in these regards. Some examples include, but are not limited to, the use of a highlighting color, hue, or intensity, contrast, border or bounding box, flickering, de-emphasizing non-highlighted areas, and so forth as desired in order to capture the observer's attention and otherwise convey "interest" in the corresponding objects.

By one approach the nature of the visual cue can vary with respect to one or more criteria of interest. For example, different colors can serve to delineate levels of concern regarding the immediate safety of persons in the vicinity of the scene.

By another approach, at 110 the control circuit 201 displays such objects in conjunction with a visual cue to thereby indicate estimated properties of the object of interest, such as estimated material composition. For example, whereas conventional materials discrimination rendering uses colors to show what material an object is made of, a similar rendering can be used to show what material a hidden object is made of after stripping away anything that obfuscates that hidden object.

These teachings will also accommodate having the control circuit 201 provide one or more alarms (as at 111) in response to detecting particular objects of interest. For example, when either or both the obfuscator and object have a particular corresponding material composition, a particular materials-based audible alarm may sound.

These teachings will also accommodate providing the detection of objects of interest as an intermediate result to be fed as the input to another subsystem. Such subsystem could, for example, perform additional processing on the same image data, or might trigger additional scanning or data collection.

These teachings will also accommodate a materials discrimination peeling functionality that can be used in combination with or in lieu of the foregoing approaches. When the high-energy image(s) contains sufficient information to permit an identification (generally or specifically) of the composition of the materials that comprise various obfuscators, and the composition of obfuscated objects (more specifically, the material composition of the superposition of the obfuscator and an object lying behind the obfuscator), these teachings will facilitate providing the user with a dynamic opportunity to "peel" away, for example, the obfuscator objects to provide a more informative view of the obfuscated objects. (There are various known approaches to providing such materials-discrimination information. Some approaches leverage, for example, two or more high-energy images of an essentially-identical scene where the various images are captured using different levels of energy and/or energy-sensitive or energy-selective detectors. As such approaches are already known in the art and as the present teachings are not overly sensitive to any particular choices in these regards, further elaboration regarding such methodologies is not presented here.) Such a peeling capability can serve in other useful regards as well.

By one approach, for example, this peeling capability provides and utilizes a background mask (i.e., a mask (or list) of pixels representing a first object (such as a shielding object or an obscuring background object) to be peeled away) and a target mask (i.e., a mask (or list) of pixels obscured by the first object). Note that some pixels might lie in both the background mask and the target mask—such pixels indicate where the two objects overlap. As a working illustrative example, presume that the first object comprises a sheet of steel while the target is another material. Pixels in the target mask include the superposition of both steel and the other material, and the user wishes to better understand the materials composition of the target (i.e. the other material).

By one approach, the process 100 at 101 allows for the user to manually select a background mask and a target mask, for example, by drawing boundaries that define the objects. By another approach, which also utilizes a previous approach, the process detects shielded and hidden regions, any detected shielded regions are treated as the background mask, and any detected hidden regions are treated as the target mask. Additional approaches can also be found by combining the above. Alternatively, the masks could be created automatically, or semi-automatically, by some other mechanism not described as part of this invention, including from other types of scanning information.

By way of example, in one approach the process 100 at 101 allows for the user to manually select a background mask that is assumed to be a shielded region. The process then detects any hidden regions within the shielded region, and uses these regions as the target mask.

As yet another approach, the process 100 at 101 allows for the user to highlight a region of the image, but without requiring this highlighting to be particularly accurate (say by roughly tracing a boundary or by drawing a non-conformal box or an ellipse around an area of interest). The process detects shielded and hidden regions in the vicinity of the highlighting (or for the entire image), and the background mask is chosen as a detected shielding region that mostly encloses the highlighted region while the target mask is chosen by finding detected hidden regions that are mostly enclosed by the highlighted region.

As a further illustrative example in these regards but without intending any particular limitations by way of the specificity of this example, a corresponding peeling algorithm can include converting the attenuation image into a scale more suitable for this activity. This conversion can comprise, for example, taking the negative logarithm of the corresponding projection data (which, for X-rays, are generally transmission values). These conversion results are referred to herein as "P." If necessary and/or otherwise desired, the peeling algorithm can also convert the materials discrimination information into a scale more suitable for this activity as well. This materials-discrimination (as-is or as scaled) is referred to herein as "K." For example, HDPE=1, aluminum=2, steel=3, and lead=4, with all other materials and mixtures of materials lying somewhere on the same scale (generally as non-integers).

In any event, using either the unprocessed data or scaled data as suggested above the peeling algorithm subtracts the aforementioned target mask from the aforementioned background mask to obtain a background-only mask. The control circuit 201 then extrapolates the attenuation image and the materials-discrimination image using only pixels that are in the background-only mask and that also have a corresponding high confidence rating with respect to materials identification, and estimates values for the pixels in the target mask. This extrapolation can be by simple linear smoothing, outlier-resilient smoothing (like median filtering), or more complicated texture-based interpolation or extrapolation. The resulting background-only attenuation image is referred to herein as "Pb" and the resulting background-only materials-discrimination image is referred to herein as "Kb." (To clarify, note that the background-only mask indicates which pixels are used to make the background-only images, not where the background-only images are valid—in particular, the background-only images are valid in the target mask, which is not part of the background-only mask).

The peeling algorithm then subtracts the background-only attenuation image Pb from the attenuation image P to obtain an estimated target-only attenuation image Pt per the following equation: Pt=P−Pb. Next, the peeling algorithm subtracts the attenuation-weighted background-only materials-discrimination image from the attenuation-weighted materials-discrimination image to obtain an attenuation-weighted target-only materials-discrimination image, which result the control circuit 201 normalizes to remove the attenuation-weighting and thereby obtain the target-only materials-discrimination image Kt per the following equation:

$$Kt=(K*P-Kb*Pb)/Pt.$$

The peeling algorithm can then provide for creating a valid peeling mask. Those skilled in the art will appreciate that the terms "masks" and "regions" are used almost synonymously here. A mask is an image of 0's and 1's indicating whether each pixel in the image satisfies some criterion. A mask could alternatively be a list of x,y coordinates (i.e., of where the 1's appear). A region, in turn, is usually represented by some description of its boundary. A list of regions can be converted to a mask by filling the inside of every region with 1's and leaving all other pixels as 0's. A mask can be converted to a list of regions by standard connected-component labeling techniques that are often available as part of morphological processing libraries for image processing.

By one approach the peeling algorithm creates a valid peeling mask having pixels for which (1) the pixels have both a high materials-discrimination confidence and are in the target mask and, optionally, (2) a sufficient portion of the target-only attenuation image Pt is greater than some threshold that may, for example, be empirically selected to suit the particular needs of a given application setting (within, for example, a sliding window of choice). If desired, the peeling algorithm can then use the valid peeling mask to optionally smooth the target-only attenuation image Pt and the target-only materials-discrimination image Kt using only pixels in the valid peeling mask.

The peeling algorithm can also optionally map the target-only materials-discrimination image Kt into a desired materials-discrimination form (such as, for example, a specific corresponding atomic number). This mapping can comprise, by one approach, undoing the K-mapping step. The output of this activity can be referred to as a peeled materials-discrimination image where the valid peeling mask indicates the corresponding materials-discrimination confidence.

By one optional approach one may also transform the target-only attenuation image Pt back into a usual attenuation (or transmission) scale if desired.

The primary output and result of this peeling algorithm comprises that peeled materials-discrimination image and its corresponding confidence mask. In some application settings the target-only attenuation image Pt might also serve as a useful output as this image does provide an indication of the amount of target material.

One can use any conventional materials-discrimination rendering method to display such results. For the sake of a simple example, assume that a conventional materials-discrimination rendering algorithm renders an image described by P (mapped, for example, to lightness or intensity) and K (mapped, for example, to hue, with associated confidence mapped to saturation) as introduced above. Then the same rendering algorithm can be applied in conjunction with the peeling algorithm in several ways:

A full-context peeled image: keeping P, but using Kt (with its associated confidence) in place of K
A no-context peeled image: using Pt in place of P, and Kt (with its associated confidence) in place of K
A background-only image: using Pb in place of P, and Kb (with its associated confidence) in place of K The output of the peeling algorithm can also be thresholded if desired to find important regions. Example threshold criteria in these regards might include, but are certainly not limited to:

When Kt is in some special region (say, above some threshold to indicate possible nuclear materials);
When Kt and Kb are very different from one another;
When Pt exceeds some threshold of choice;
When a particular region is above some minimum size.

Those skilled in the art will recognize that the criterion in the various steps described above can be accomplished by relatively simple combinations of morphological operations (where morphological operations are generally known in the art, and the expression "morphological" will be understood to refer to those techniques that provide for the analysis and processing of geometrical structures, often based on set theory, lattice theory, topology, and random functions using one or more operators that transform images according to the above characterizations). In a given application setting and/or instantiation such processing may only approximately accomplish the specified goal (such as an "At least 50% of the border of the object is surrounded by at least some minimum radius of shielding material" criterion) while other times the selected technique may perform the criterion exactly. In addition, if desired, pixel-based criteria can generally be applied before object-based criteria (for example, when the criteria involve a minimum-attenuation constraint and a minimum-size constraint, this can be accomplished by first testing attenuation by per-pixel thresholding and then by performing morphological operations on the thresholding result).

It will also be understood that almost all of these operations can be performed either directly, on full-resolution images (employing, for example, large processing kernels) and/or on a reduced-resolution image, where pixels can be combined into a reduced-size image that is processed using correspondingly reduced-size processing kernels and then upsampled. The latter option can be especially useful for steps that are processing intensive, such as smoothing approaches that are outlier-resilient—this class of smoothing includes median filtering, or fitting with Huber functions or L1 minimization. These types of smoothing are particularly useful in smoothing to find obfuscating objects or to smooth away obfuscated objects, since any pixels from the obfuscated object (or its remnants) should be ignored as outliers during the smoothing process, as should holes and blips. Such smoothing steps typically include large spatial support, or equivalently, a large smoothing kernel, and thus without special care can easily be quite computationally intensive.

The foregoing teachings can be leveraged in various ways to obtain a variety of useful masks. Masks can be formed using, for example, the output of the earlier-described process to identify shielding, hidden, or shielded objects, the output of the peeling algorithm (after thresholding as desired), and Boolean combinations using the above. Some examples in the latter regard include, but are not limited to, combining obfuscated-objects results with multiple parameters sets (such as different size/attenuation thresholds), combining peeling algorithm results with different parameter sets, and applying other thresholds with respect to attenuation or the materials-discrimination image.

As one illustrative example in these regards, the following rule can be useful for finding things that pose a potential nuclear threat—when an obfuscated-object analysis finds a big shielded object or a small shielded object, and for that object either a) the peeling algorithm found that Z exceeds 50, or b) attenuation is large and the original materials discrimination image had few or no high-confidence pixels in and around the object, then highlight the region accordingly. Such a rule "plays it safe" by using materials discrimination processing when available, but still using attenuation values as best as possible when no materials discrimination information is available.

Figure 3:
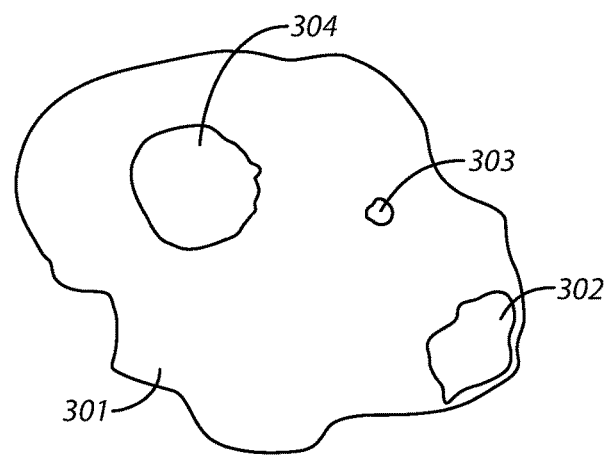
FIG. 3 comprises a screen shot as configured in accordance with various embodiments of the invention.

As a further, simple illustrative example in these regards, FIG. 3 presents a first object 301 having three objects 302-304 obfuscated thereby. Applying the process 100 described above, the first object 301 can be identified as a candidate visual obfuscator while two of the remaining objects 302 and 304 can be identified as candidate objects upon determining that the small object 303 is in fact too small to be so categorized. The object 302 that is located very close to the border of the visual obfuscator 301 can then be eliminated as being possibly of interest pursuant to an assessment requirement that requires the candidate object to be further from that boundary. As a result, the process 100 can identify the remaining object 304 as being of interest.

Figure 4:
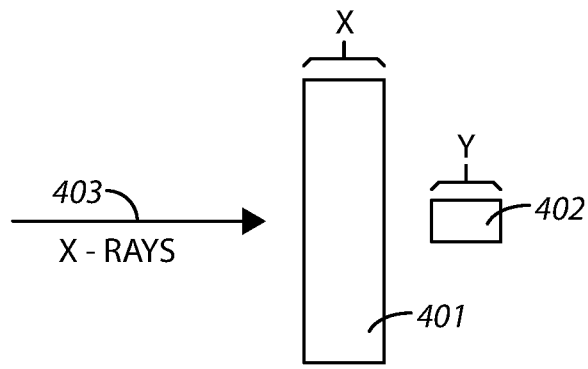
FIG. 4 comprises a side-elevational view in accordance with various embodiments of the invention.
Figure 5:
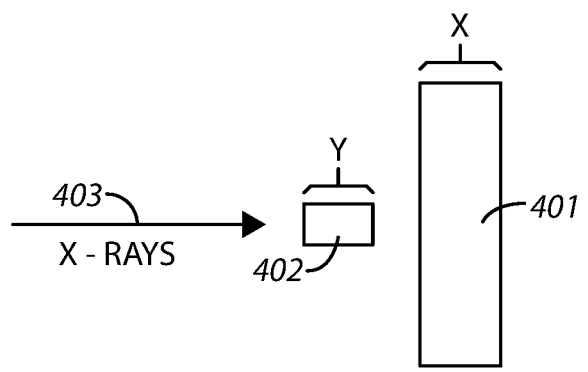
FIG. 5 comprises a side-elevational view in accordance with various embodiments of the invention.

It may be worth noting here that the obfuscator 301 may comprise material that may be in front of, or behind, the candidate objects. FIG. 4 illustrates an example where an obfuscator 401 comprised of a first material and having a thickness X is interposed between a given candidate object 402 (comprised of a second material and having a thickness Y) and the incoming X-rays 403. FIG. 5, on the other hand, illustrates an example where the same obfuscator is disposed on the back side of the candidate object 402 (as viewed from the perspective of the in-coming X-rays 403). Those skilled in the art will understand that the resultant two-dimensional X-ray image for both of these examples will be, for all practical purposes, identical to one another.

Figure 6:
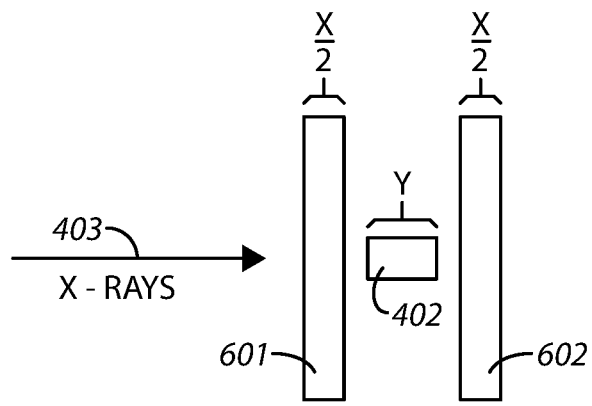
FIG. 6 comprises a side-elevational view in accordance with various embodiments of the invention FIG. 7 comprises a screen shot as configured in accordance with various embodiments of the invention.

In these same regards, FIG. 6 illustrates an example where the "obfuscator" comprises two obfuscating objects 601 and 602 that are both comprised of the aforementioned first material and that both have a thickness X/2 that is half the thickness of the obfuscator 401 of FIGS. 4 and 5. In this example, the same candidate object 402 as described above is interposed between these two obfuscating objects 601 and 602. And again, given the materials and dimensions described, the corresponding X-ray image for such a scene will be essentially identical to the resulting scenes as correspond to the examples shown in FIGS. 4 and 5 described above. Note there are countless other scenes that would also look identical to FIGS. 4, 5, and 6. For example, the objects denoted by 601 and 602 could comprise materials of thickness X×0.1 and X×0.9, respectively. Or instead of just one or two, there might be ten obfuscators, each with thickness X×0.1. Additionally, in practical scenes, often the obfuscator 401 will not have a clean shape or even a single "thickness" but is rather more of a blob of material where X can be different for each pixel, or could even be split differently for each pixel.

Figure 7:
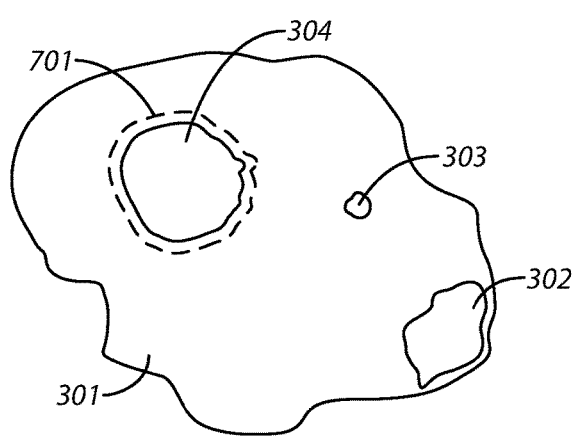

Returning again to the example of FIG. 3, and referring now to FIG. 7 as well, the process 100 can then visually highlight this object 304 in a predetermined manner. Here, this highlighting is exemplified by a peripheral effect 701 that conformally surrounds the object 304. This peripheral effect 71 can comprise, for example, a distinguishing (and contrasting) color, a flashing effect, or whatever other visual effect may be preferred in a given application setting. The peripheral boundary is configurable, so the peripheral effect 701 might tightly follow the object's 304 boundary, or might be some distance away. The peripheral effect 701 might also be a configurable shape: it might be configured to follow the contour of the found object, or it might comprise a bounding box that encapsulates the object.

These teachings will also accommodate using a highlighting effect that highlights the entire object 304 rather than merely the periphery of the object 304. Such an over-all highlighting effect can again comprise any of a variety of visually-distinguishing treatments such as distinguishing uses of color, brightness, grayscale, hue, and so forth.

Figure 8:
FIG. 8 comprises a screen shot as configured in accordance with various embodiments of the invention.

Referring to FIG. 8, a peeling technique (such as the peeling algorithm) disclosed above) can serve to facilitate peeling away (i.e., removing from view) the visual obfuscator 301 and/or other objects that are not of interest to provide a clearer view of an object of interest such as the object 304 in the foregoing examples. The foregoing peeling can apply regardless of the orientation of the object 304 with respect to the obfuscator 301 such that the obfuscator can be separated regardless of whether the obfuscator is positioned in front of the object (as shown in FIG. 4) or behind the object (as shown in FIG. 5) and regardless of whether the obfuscator comprises a plurality of individual items as shown in FIG. 6.

By one approach this peeling activity can include subtracting background-only material and attenuation from the background-plus-object material and attenuation to provide object-of-interest-only material and attenuation. (As used herein, this reference to "background" will be understood to refer to pixel-based content in the corresponding X-ray image as pertains to the aforementioned obfuscators and hence can apply to things that are in the foreground of the physical scene (such as the obfuscator 401 shown by way of example in FIG. 4).) These teachings will then readily accommodate displaying the object-of-interest-only material and attenuation in an absence of the background-only material and attenuation to help the viewer quickly and intuitively understand both the presence of the object and, for example, the shape and material constituency of that object.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

I claim:

1. A method comprising:
by a control circuit having access to at least one high-energy image of a scene, wherein the at least one high-energy image is formed by a superimposing image-forming method:
   assessing the at least one high-energy image of the scene to identify candidate obfuscators, the assessing including, at least in part, determining a composition of a material that comprises at least one of the candidate obfuscators;
   assessing the at least one high-energy image of the scene to identify candidate obfuscated objects, this assessing including, at least in part, determining a composition of a material that comprises at least one of the candidate obfuscated objects;
   processing information regarding the candidate obfuscated objects to identify objects of interest wherein objects are identified as being of interest as a function, at least in part, of the material composition of both the object and the obfuscator that at least partially obfuscates that object; and
wherein the candidate obfuscators and the candidate obfuscated objects are superimposed in the at least one high-energy image.

2. The method of claim 1 wherein the at least one high-energy image of a scene comprises at least one x-ray image of the scene.

3. The method of claim 2 wherein the at least one x-ray image of the scene comprises at least one x-ray image of a mobile shipping container.

4. The method of claim 1 wherein:
assessing the at least one high-energy image of the scene to identify candidate obfuscators comprises using a first assessment algorithm in conjunction with a first set of assessment parameters;
assessing the at least one high-energy image of the scene to identify candidate obfuscated objects comprises using a second assessment algorithm in conjunction with a second set of assessment parameters wherein the second assessment algorithm is different from the first assessment algorithm; and
processing information regarding the candidate objects to identify objects of interest comprises using a third assessment algorithm in conjunction with a third set of assessment parameters wherein the third assessment algorithm is different from both the first assessment algorithm and the second assessment algorithm.

5. The method of claim 4 wherein at least one of the assessment parameters is selectively modifiable by an end user via a user interface that operably couples to the control circuit.

6. The method of claim 4 wherein the assessment parameters used in conjunction with assessing the at least one high-energy image of the scene to identify candidate obfuscators include at least one assessment parameter regarding at least one of:
a particular attenuation constraint;
a particular size constraint;
a particular shape constraint;
a particular edge constraint;
a particular location constraint; and
a particular material constraint.

7. The method of claim 4 wherein the assessment parameters used in conjunction with assessing the at least one high-energy image of the scene to identify candidate obfuscated objects include at least one assessment parameter regarding at least one of:
a minimum amount of additional attenuation as compared to a corresponding candidate visual obfuscator;
a particular size constraint;
a particular shape constraint;
a particular edge constraint;
a particular location constraint; and
a particular material constraint.

8. The method of claim 4 wherein the assessment parameters used in conjunction with processing information regarding the candidate objects to identify objects of interest include at least one assessment parameter regarding:
a particular size constraint on a size of a candidate obfuscator;
a particular size constraint on a size of a candidate obfuscated object;
a particular constraint on a relative size of a candidate obfuscated object versus an obfuscator;
a particular shape constraint;
a particular edge constraint;
a particular location constraint;
a particular material constraint; or
a particular constraint regarding a comparison of a boundary of a candidate object to a boundary of a corresponding candidate obfuscator.

9. The method of claim 1 further comprising:
using information from at least one of:
   the candidate obfuscators;
   the candidate obfuscated objects; and
   the objects of interest;
to display at least one object of interest in conjunction with a visual cue regarding at least one criterion of interest.

10. The method of claim 9 wherein displaying the object of interest in conjunction with a visual cue regarding the at least one criterion of interest includes using dynamically-entered user selections regarding at least one of:
a particular rendering algorithm from amongst a plurality of candidate rendering algorithms; and
at least one rendering-algorithm parameter.

11. The method of claim 1 further comprising:
receiving user input specifying a portion of the high-energy image of the scene;
and wherein at least one of identifying the candidate visual obfuscators and identifying the candidate objects is conducted as a function, at least in part, of the user input.

12. The method of claim 1 further comprising:
providing an alarm to indicate when at least one predetermined property of the object of interest satisfies at least one predetermined criteria.

13. The method of claim 12 further comprising:
providing an alarm as a function of material composition of at least one of a visual obfuscator and an object.

14. The method of claim 1 further comprising:
subtracting background-only material and attenuation from background-plus-object material and attenuation to provide object-of-interest-only material and attenuation.

15. The method of claim 14 further comprising at least one of:
displaying the object-of-interest-only material and attenuation in an absence of the background-only material and attenuation; and displaying the object-of-interest-only material in an absence of the background-only material.

16. An apparatus comprising:
a control circuit having access to at least one high-energy image of a scene, the at least one high-energy image being formed by a superimposing image-forming method, wherein the control circuit is configured to:
assess the at least one high-energy image of the scene to identify candidate obfuscators by, at least in part, determining a composition of a material that comprises at least one of the candidate obfuscators;
assess the at least one high-energy image of the scene to identify candidate objects that may be obfuscated by the candidate obfuscators, this assessing including, at least in part, determining a composition of a material that comprises at least one of the candidate objects; and
process information regarding the candidate objects to identify objects of interest wherein objects are identified as being of interest as a function, at least in part, of the material composition of both the object and the obfuscator that at least partially obfuscates that object;
wherein the candidate obfuscators and the candidate obfuscated objects are superimposed in the at least one high-energy image.

17. The apparatus of claim 16 wherein the control circuit is configured to:
assess the at least one high-energy image of the scene to identify candidate obfuscators-by using a first rendering algorithm in conjunction with a first set of assessment parameters;
assess the at least one high-energy image of the scene to identify candidate obfuscated objects by using a second rendering algorithm in conjunction with a second set of assessment parameters wherein the second rendering algorithm is different from the first rendering algorithm; and
process information regarding the candidate objects to identify objects of interest by using a third rendering algorithm in conjunction with a third set of assessment parameters wherein the third rendering algorithm is different from both the first rendering algorithm and the second rendering algorithm.

18. The apparatus of claim 17 wherein at least one of the assessment parameters is selectively modifiable by an end user via a user interface that operably couples to the control circuit.

19. The apparatus of claim 16 wherein the control circuit is further configured to display at least one of the objects of interest in conjunction with a visual cue regarding at least one criterion of interest.

20. The apparatus of claim 16 wherein the control circuit is further configured to:
subtract background-only material and attenuation from background-plus-object material and attenuation to provide object-of-interest-only material and attenuation.

21. The apparatus of claim 20 wherein the control circuit is further configured to do at least one of:
display the object-of-interest-only material and attenuation in an absence of the background-only material and attenuation; and
display the object-of-interest-only material in an absence of the background-only material.

* * * * *